(12) United States Patent
Fukushima et al.

(10) Patent No.: US 12,551,989 B2
(45) Date of Patent: Feb. 17, 2026

(54) WORKPIECE HOLDING DEVICE AND INSPECTION DEVICE COMPRISING WORKPIECE HOLDING DEVICE

(71) Applicant: NHK SPRING CO., LTD., Yokohama (JP)

(72) Inventors: Koichi Fukushima, Yokohama (JP); Akira Honma, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 366 days.

(21) Appl. No.: 18/453,366

(22) Filed: Aug. 22, 2023

(65) Prior Publication Data

US 2024/0075592 A1 Mar. 7, 2024

(30) Foreign Application Priority Data

Sep. 1, 2022 (JP) .................................. 2022-139031

(51) Int. Cl.
*B25B 11/00* (2006.01)
*G06T 7/00* (2017.01)
(52) U.S. Cl.
CPC .......... *B25B 11/005* (2013.01); *G06T 7/0004* (2013.01); *G06T 2207/30164* (2013.01)
(58) Field of Classification Search
CPC ......... B25B 11/00; B25B 11/005; B23Q 3/00; B23Q 3/06; B23Q 3/067
See application file for complete search history.

(56) References Cited

U.S. PATENT DOCUMENTS

| 5,887,430 A | * | 3/1999 | Hirai | B25B 5/061 |
| | | | | 191/10 |
| 10,332,551 B2 | | 6/2019 | Uetake et al. | |
| 11,152,022 B2 | | 10/2021 | Uetake et al. | |
| 2020/0111715 A1 | * | 4/2020 | Naohara | G06T 7/0004 |
| 2022/0009009 A1 | * | 1/2022 | Suzuki | B23Q 1/621 |
| 2024/0075592 A1 | * | 3/2024 | Fukushima | B25B 11/005 |

FOREIGN PATENT DOCUMENTS

| JP | 2016074099 A | 5/2016 |
| JP | 2016087611 A | 5/2016 |

* cited by examiner

*Primary Examiner* — Lee D Wilson
(74) *Attorney, Agent, or Firm* — Holtz, Holtz & Volek PC

(57) ABSTRACT

A workpiece holding device includes a workpiece support surface and a blow suction unit. The workpiece support surface includes suction holes formed therein. A workpiece placed on the workpiece support surface is adsorbed by the suction holes. The blow suction unit includes an ionizer that ionizes gas (for example, air), a jet outlet that jets the gas toward the workpiece and a suction inlet. The gas blown onto and reflected off the workpiece is suctioned through the suction inlet. While blowing the ionized gas onto the workpiece, the blow suction unit is moved relative to the length direction of the workpiece.

9 Claims, 7 Drawing Sheets

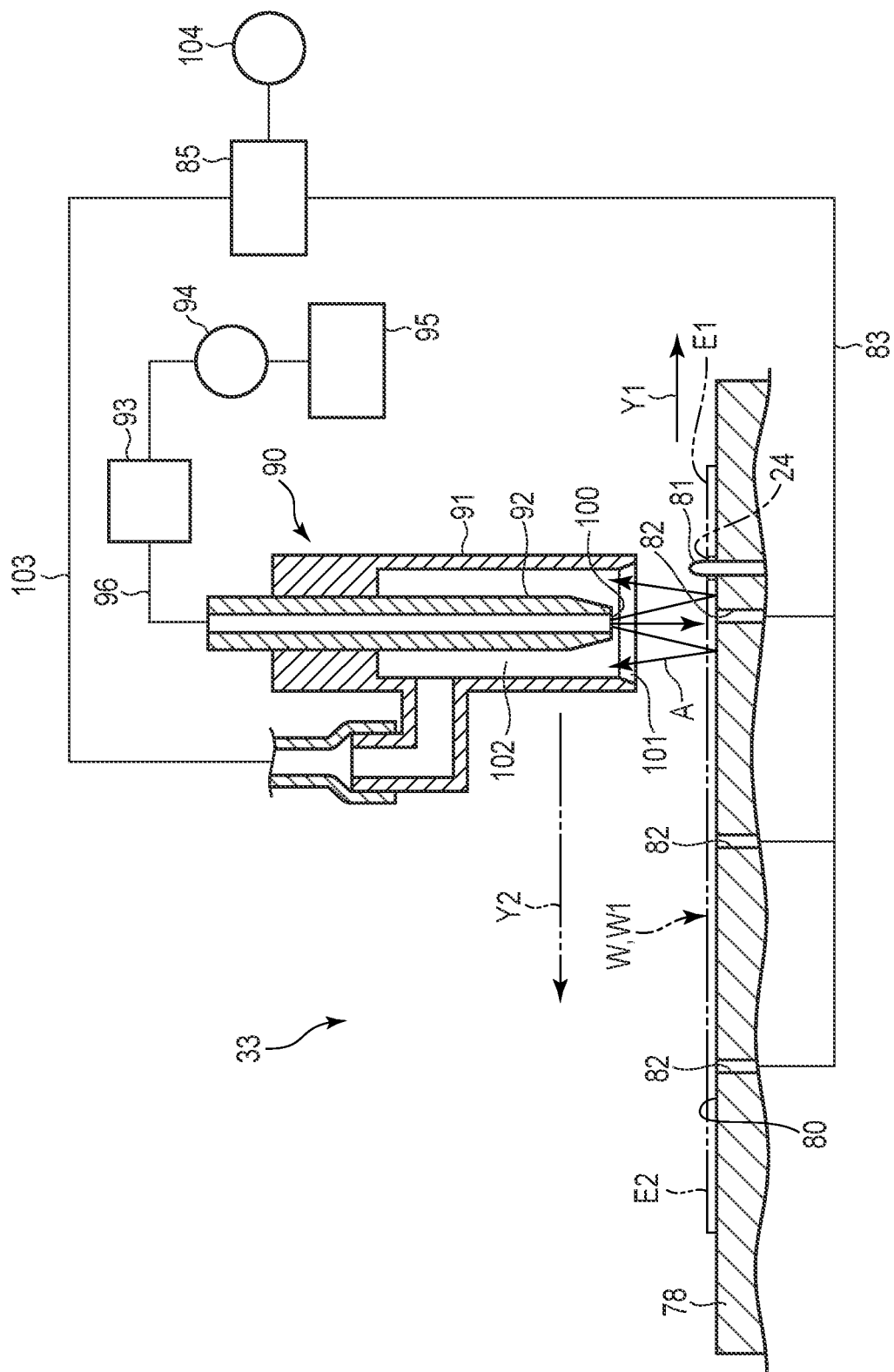
F I G. 4

WORKPIECE HOLDING DEVICE AND INSPECTION DEVICE COMPRISING WORKPIECE HOLDING DEVICE

CROSS-REFERENCE TO RELATED APPLICATIONS

This application is based upon and claims the benefit of priority from prior Japanese Patent Application No. 2022-139031 filed Sep. 1, 2022, the entire contents of which are incorporated herein by reference.

BACKGROUND OF THE INVENTION

1. Field of the Invention

The present invention relates to a workpiece holding device for holding, for example, a workpiece such as a disk drive suspension or the like, and an inspection device comprising such a workpiece holding device.

2. Description of the Related Art

Disk drives are used in information processing devices such as personal computers. Disk drives are provided with a magnetic disk that rotates around a spindle and a carriage that pivots around a pivot axis, and the like. A disk drive suspension is provided on the arm of the carriage.

Disk drive suspensions comprises a base plate, a load beam and a flexure. An example of the disk drive suspensions is described in JP 2016-87611 A (Patent Literature 1). The flexure described in Patent Literature 1 includes a metal base made from a thin stainless steel plate and a wiring portion formed on the metal base. A slider is placed on a gimbal portion formed near the tip of the flexure. The slider includes an element which functions as a magnetic head installed therein. The flexure includes a flexure tail extending in the length direction of the load beam.

As described above, the disk drive suspension includes the flexure and the load beam. In order to inspect the disk drive suspension, an inspection device may be used. An example of the inspection device includes a workpiece holding device, a camera and a transport mechanism. The workpiece holding device holds a workpiece such as a disk drive suspension, at a predetermined position. The camera shoots an image of the workpiece fixed by the workpiece holding device. The transport mechanism transports the workpiece.

Here, when handling thin and slender workpieces such as the disk drive suspension described above, utmost care and attention are required. The workpiece holding device described above for holding such a workpiece at a predetermined position includes, for example, a suction device. An adoption stage of the suction device adsorbs the workpiece by negative pressure. An example of suction devices is described in JP 2016-74099 A (Patent Literature 2). The suction device described in Patent Literature 2 secures a workpiece placed on the suction stage to the mount surface by negative pressure.

The flexure of the disk drive suspension includes a metal base, an insulation layer and a conductor. The metal base is formed from a thin stainless steel plate. The insulation layer is formed on the metal base. The conductor is made of copper and is formed on the insulating layer. Such workpieces (disk drive suspensions) may be charged with static electricity during the manufacturing process or during transportation, etc. Thin and slender workpieces are easily deformable in the thickness direction and can be warped easily.

When the workpiece is placed on the suction stage, it is adsorbed to the suction stage by negative pressure. Here, note that a part of the workpiece charged with static electricity may be separated from the suction stage or warped. If the workpiece is not placed correctly on the suction stage, the image of the workpiece cannot be shot correctly, which may cause hinderance in inspection.

An object of an embodiment of the present invention is to provide a workpiece holding device which can securely hold a workpiece when inspecting a plate-shaped workpiece such as a disk drive suspension, and an inspection device comprising such a workpiece holding device.

BRIEF SUMMARY OF THE INVENTION

According to one embodiment, a workpiece holding device comprises a work placement table, a suction hole, a negative pressure generating source, a blow suction unit, and a movement mechanism. The workpiece placement table includes a workpiece support surface on which a workpiece is placed. The suction hole is formed in the workpiece support surface. The suction hole is open at a position corresponding to the workpiece placed on the workpiece support surface. The negative pressure generating source is connected to the suction hole and suctions air through the suction hole. The blow suction unit includes a jet outlet and a suction inlet. The jet outlet blows gas (for example, air) from above the workpiece toward the workpiece placed on the workpiece support surface. The suction inlet suctions the gas that blown on and reflected off the workpiece. The movement mechanism moves the workpiece placed on the workpiece support surface and the blow suction unit relative to the length direction of the workpiece.

According to the workpiece holding device of the embodiment, thin and slender workpieces, such as disk drive suspensions, can be securely held on the work support surface.

The workpiece holding device of this embodiment should preferably include an ionizer. The ionizer ionizes the gas supplied to the jet outlet. Note that if the electrostatic charging on the workpiece is not at such a problematic degree, the ionizer may not be used. A positioning pin may be provided on the workpiece support surface. The positioning pin is inserted to a hole in the workpiece.

The movement mechanism may be a movement unit that moves the blow suction unit relative from a first end portion towards a second end portion of the workpiece. The positioning pin may be located near the first end portion. According to one embodiment, a plurality of suction holes each identical to the suction hole may be provided and the suction holes may be formed to be spaced apart at intervals along the length direction of the workpiece. One example of the workpiece is a disc device suspension including a base plate. A boss portion is formed in the base plate. The positioning pin may be inserted to a hole in this boss portion.

According to another embodiment, an inspection device comprises a workpiece holding device, a work placement portion, an inspection portion, and a transport mechanism with a suction unit. A plurality workpieces each identical to the workpiece are placed on the workpiece placement portion. The inspection portion is located at a position different from that of the workpiece placement portion. The inspection portion comprises, for example, a camera or the like for inspecting the workpieces. The transport mechanism moves the workpiece to be inspected, that is placed on the workpiece placement portion towards the inspection portion. Further, the transport mechanism moves the workpiece inspected in the inspection portion towards the workpiece placement portion.

The suction unit adsorbs the workpiece to be inspected, that is placed on the workpiece placement portion. The suction unit releases, when the workpiece to be inspected is moved to above the workpiece support surface, the adsorption of the workpiece to be inspected. Further, the suction unit adsorbs the inspected workpiece placed on the workpiece support surface. The suction unit releases the adsorption of the inspected workpiece when the inspected workpiece is moved to above the workpiece placement portion.

According to the inspection device of this embodiment, the workpiece to be inspected can be held in an appropriate state in the inspection portion.

The suction unit may include a first suction portion and a second suction portion. The first suction portion adsorbs the workpiece to be inspected, that is placed on the workpiece placement portion. Then, the first suction portion holds the workpiece to be inspected until the workpiece to be inspected is moved from the workpiece placement portion to above the workpiece support surface. The second suction portion adsorbs the inspected workpiece placed on the workpiece support surface. Then, the second suction portion holds the inspected workpiece until the inspected workpiece is moved from the workpiece support surface to above the workpiece placement portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a cross-sectional view of the part of the workpiece holding device of the inspection device shown in FIG. 1.

DETAILED DESCRIPTION OF THE INVENTION

An inspection device 10 of one embodiment will now be described with reference to FIGS. 1 to 8.

Figure 1:
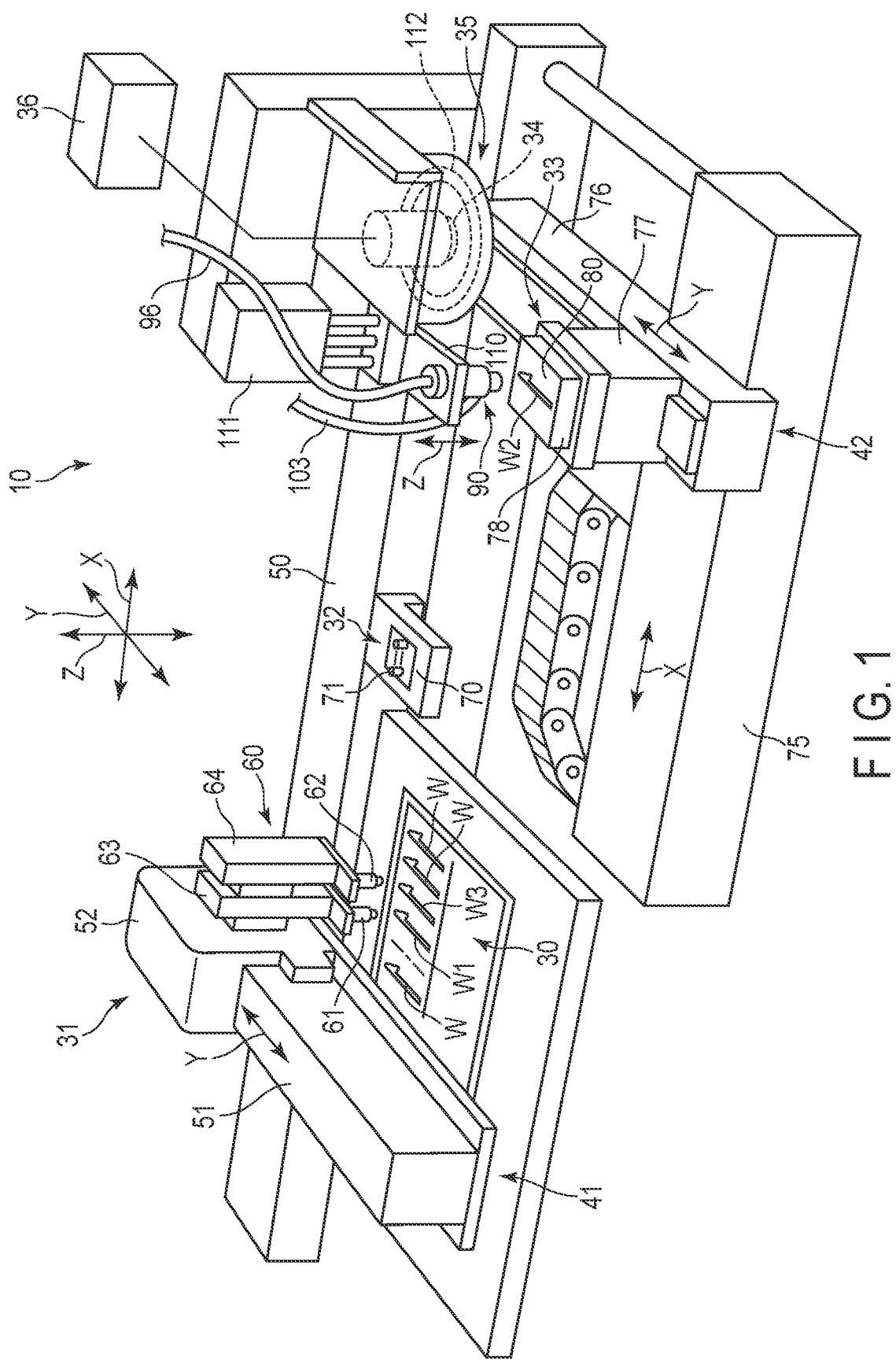
FIG. 1 is a perspective view of an inspection device according to one embodiment, when a suction unit, a workpiece and the like are located at a first position.

FIG. 1 is a perspective view showing the inspection device 10 when parts thereof (for example, a suction unit 60, workpieces and the like) are at a first position. The inspection device 10 includes a workpiece placement portion 30. On the workpiece placement portion 30, a plurality of workpieces W are placed in plane at a predetermined pitch along the horizontal direction. In this specification and the drawings, for the convenience of explanation, a plurality of reference symbols (W, W1, W2, W3) are used to indicate the workpieces. But this is merely for the convenience of explanation, and these workpieces W, W1, W2 and W3 are common. Note that in some embodiments, the workpieces W, W1, W2, and W3 may differ from each other.

Figure 2:
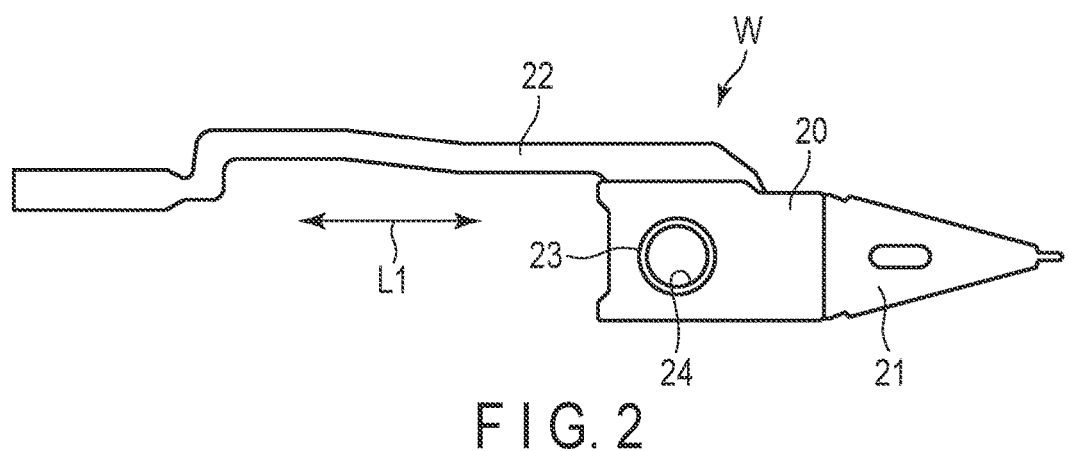
FIG. 2 is a plan view of a disk drive suspension as an example of a workpiece.

FIG. 2 is a plan view of a disk drive suspension as an example of a workpiece W. The workpiece W shown in FIG. 2 includes a base plate 20, a load beam 21 and a flexure 22. The workpiece W has a thin and slender shape (plate-like). The flexure 22 includes a metal base and a wiring portion. The metal base is made from a thin stainless steel plate. The wiring portion is formed on the metal base. The flexure 22 extends in the length direction of the workpiece W. In FIG. 2, a bidirectional arrow L1 indicates the length directions of the workpiece W. A circular hole 24 is formed in a boss portion 23 of the base plate 20. The boss portion 23 is fixed to the carriage arm of the hard disk drive.

Figure 3:
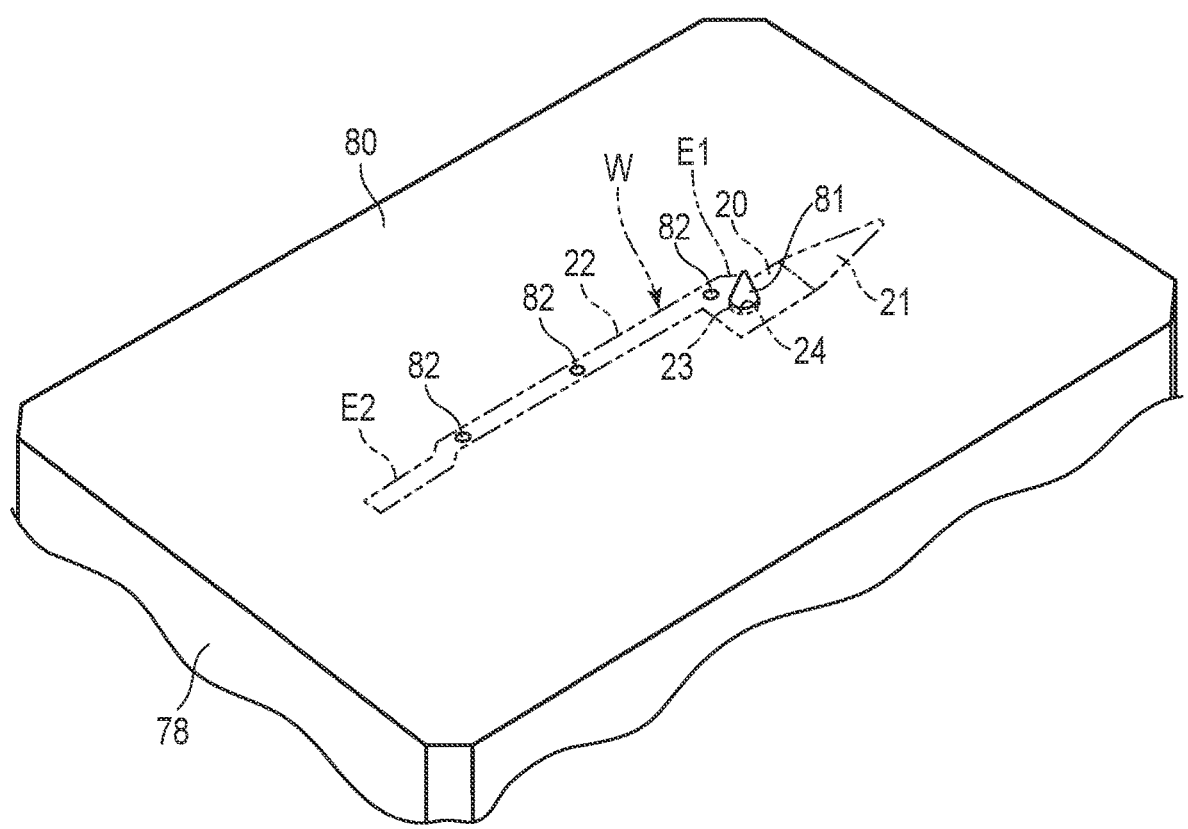
FIG. 3 is a perspective view of a part of a workpiece holding device of the inspection device shown in FIG. 1.

The inspection device 10 includes a transport mechanism 31 that transports workpieces W, a positioning mechanism 32 for positioning the workpieces W, a workpiece holding device 33, an inspection portion including a camera 34 and a control portion 36. The control portion 36 has a function of judging whether a workpiece W shot by the camera 34 is acceptable or not, and the like. The workpiece W to be inspected is held in the workpiece holding device 33. FIG. 3 is a perspective view of a part of the workpiece holding device 33, and FIG. 4 is a cross-sectional view of a part of the workpiece holding device 33.

The transport mechanism 31 includes a first movement unit 41 located on a left-hand side in FIG. 1 and a second movement unit 42 located on a right-hand side in FIG. 1. The first movement unit 41 includes a first X-direction guide member 50, a first Y-direction guide member 51 and a first carriage 52. The first X-direction guide member 50 extends in an X-axis direction (indicated by a bidirectional arrow X in FIG. 1). The first Y-direction guide member 51 extends in a Y-axis direction (indicated by a bidirectional arrow Y in FIG. 1). The first carriage 52 is mounted on the first Y-direction guide member 51.

The first Y-direction guide member 51 moves in the X-axis direction along the first X-direction guide member 50 by a drive mechanism, which includes, for example, a servomotor and a ball screw. The first carriage 52 moves in the Y-axis direction along the first Y-direction guide member 51 by a drive mechanism, which includes, for example, a servomotor and a ball screw. That is, the first movement unit 41 functions as an XY movement table to move the first carriage 52 to a desired position in the XY axis directions.

The first carriage 52 is provided with a suction unit 60 which is movable in up-and-down directions. The suction unit 60 includes a first suction portion 61 and a second suction portion 62. The first suction portion 61 and the second suction portion 62 can be moved independently of each other in the up-and-down directions by lift drive mechanisms 63 and 64, respectively. Here, the term "up-and-down directions" refers to directions along the Z-axis (indicated by a bidirectional arrow Z in FIG. 1). The suction portions 61 and 62 include lower ends at which suction ports for sucking in air are formed, respectively. When negative pressure is generated at these suction ports, the workpiece W can be suctioned. When the negative pressure of the above-described suction ports of the suction portion 61 and 62 is shut off, the suction of the workpiece is released.

The positioning mechanism 32 is provided at a predetermined position of the inspection device 10. The positioning mechanism 32 includes an upper surface 70 on which workpieces W are to be placed and a positioning member 71 that is moved by an actuator. The positioning member 71 moves in the direction to interpose the workpiece W therebetween and positions the workpiece W along the horizontal direction.

The second movement unit 42 includes a second X-direction guide member 75, a second Y-direction guide member 76 and a second carriage 77. The second X-direction guide member 75 extends in the X-axis direction. The second Y-direction guide member 76 extends in the Y-axis direction. The second Y-direction guide member 76 moves in the X-axis direction along the second X-direction guide member 75 by a drive mechanism, which includes, for example, a servomotor and a ball screw.

The second carriage 77 is mounted on the second Y-direction guide member 76. The second carriage 77 moves in the Y-axis direction along the second Y-direction guide member 76 by a drive mechanism, which includes, for example, a servomotor and a ball screw. That is, the second movement unit 42 functions as an XY movement table to move the second carriage 77 to a desired position in the XY axis direction.

As shown in FIG. 1 and FIG. 3, and the like, a workpiece placement table 78 is provided above the second carriage 77. On the workpiece placement table 78, a workpiece support surface 80 is provided. The workpiece support surface 80 supports the workpiece W in a predetermined position. The workpiece support surface 80 extends substantially horizontally. A positioning pin 81 is provided on the workpiece support surface 80. The positioning pin 81 projects upward from the workpiece support surface 80. In the state where the workpiece W is placed on the workpiece support surface 80, the positioning pin 81 is inserted to the hole 24 of the boss portion 23.

A plurality of suction holes 82 are formed in the workpiece support surface 80. The workpiece W is placed at a predetermined position on the workpiece support surface 80, as indicated by the two-dotted line in FIG. 3. The plurality of suction holes 82 are open at positions corresponding to the workpiece W. These suction holes 82 are formed to be spaced apart from each other along the length direction of the workpiece W placed on the workpiece support surface 80.

As shown in FIG. 4, the suction holes 82 are each connected to a negative pressure generating source 85 such as an exhaust pump or the like, via a suction pipe 83. The negative pressure generated by the negative pressure generating source 85 causes air to be sucked in through the suction holes 82. When air is sucked in through the suction holes 82, the workpiece W placed on the workpiece support surface 80 is adsorbed and held on the workpiece support surface 80.

As shown in FIGS. 1, 4 and the like, the workpiece holding device 33 includes a blow suction unit 90. A blow suction unit 90 includes an outer cylinder 91, an inner cylinder 92, an ionizer 93 (static electricity remover), a filter 94, a gas supply source 95 and the like. The supply source 95 supplies compressed gas to the inner cylinder 92 via the ionizer 93. The compressed gas is, for example, air or inert gas. One example of the ionizer 93 includes a discharge needle. High voltage is applied to this discharge needle to release ions, and the ionized gas (for example, air) is supplied to the supply pipe 96. Note that when the electrostatic charge on the workpiece is at such a degree that would cause no problem, the ionizer 93 may not be used.

A jet outlet 100 is opened at a lower end of the inner cylinder 92. The jet outlet 100 is connected to the supply source 95 via the supply pipe 96 and the ionizer 93. The gas (for example, air) supplied from the supply source 95 is ionized by the ionizer 93. The ionized gas is jetted from the jet outlet 100 towards the workpiece W from above the workpiece W. The gas (for example, air) jetted from the jet outlet 100 blows on and reflects off the workpiece W and the workpiece support surface 80, as shown by the arrow A in FIG. 4. A suction inlet 101 is opened between the lower end of the outer cylinder 91 and the inner cylinder 92. A suction chamber 102 is formed between the outer cylinder 91 and the inner cylinder 92. The suction inlet 101 is communicated to the suction chamber 102. The suction chamber 102 is connected to the negative pressure generating source 85 via a suction tube 103. The gas (for example, air) suctioned in from the suction inlet 101 enters the suction chamber 102, and is discharged to the negative pressure generating source 85 via a filter 104.

The blow suction unit 90 is installed on a lift member 110. The lift member 110 is movable in the up-and-down directions (Z-axis directions). The lift member 110 is moved by the drive unit 111 in the up-and-down directions. When blowing air onto the workpiece W, the jet outlet 100 of the blow suction unit 90 is lowered to a close distance directly above the workpiece W. Ionized air is jetted from the jet outlet 100 toward the workpiece W. Under this condition, the second carriage 77 moves in the Y-axis direction (in the direction indicated by the arrow Y1 in FIG. 4). At this time, the workpiece W is adsorbed onto the workpiece support surface 80 by the air suctioned in through the suction holes 82.

That is, while the workpiece W is being adsorbed on the workpiece support surface 80, the ionized air is jetted out from the jet outlet 100 toward the workpiece W. At the same time, the workpiece placement table 78 moves relative to the blow suction unit 90. The direction of movement is in the length direction of the workpiece W (direction indicated by an arrow Y1 in FIG. 4). At this time, the workpiece W is adsorbed onto the workpiece support surface 80. With this configuration, the ionized air is continuously blown along the length direction of the workpiece W from a first end portion E1 of the workpiece W to a second end portion E2. The first end portion E1 is located near the base plate 20.

Since the ionized air is blown onto the workpiece W, static electricity, which may be charged on the workpiece W, is removed. In this manner, a longitudinal part of the workpiece W, which is thin and easily bendable, can be suppressed from being detached from the workpiece support surface 80 and warped. Thus, substantially the entire surface of the workpiece W is tightly adsorbed along the workpiece support surface 80.

In this embodiment, the workpiece placement table 78 on which the workpiece W is placed moves in the direction indicated by the arrow Y1 in FIG. 4. The second movement unit 42 is an example of a movement mechanism. This movement mechanism moves the workpiece support surface 80 on which the workpiece W is placed relative to the blow suction unit 90 in the length direction of the workpiece W (in the direction indicated by the arrow Y1 in FIG. 4). But in other embodiments, the blow suction unit 90 may be moved in the direction indicated by the arrow Y2 in FIG. 4 relative to the workpiece placement table 78.

As shown in FIG. 1 and the like, the inspection portion 35 includes a camera 34 which shoots an image of the workpiece W and a light 112 (for example, a ring light) which applies illumination light onto the workpiece W. The second carriage 77 on which the workpiece W to be inspected is carried, moves under the camera 34. The image of the workpiece W taken by the camera 34 is sent to a control portion 36 to be subjected to image processing.

In the case where the image of the entire workpiece W can be taken in one shot, the workpiece W is moved directly under the camera 34 to shot the image of the workpiece W. Note here that depending on the length of the workpiece W and the specifications of the camera 34, it may not be possible to cover the entire workpiece W at one time. In such a case, the workpiece W is shot a plurality of times while the second carriage 77 on which the workpiece W is mounted is moved forward intermittently along the Y-axis direction.

Next, the operation of the inspection device of this embodiment will now be explained with reference to FIG. 1 and FIGS. 5 to 8. An example of the workpiece W to be inspected is a disk drive suspension. Note that the item to be inspected (workpiece) may be other than a disk drive suspension. Further, a device other than the camera 34 may be used to inspect the workpiece W.

FIG. 1 schematically illustrates the case where the workpiece W and the suction unit 60 or the like are in the first position. A plurality of workpieces W are placed at a predetermined pitch in the workpiece placement portion 30. In this specification, the case where a workpiece W1 which is fourth one from the right among the plurality of workpieces W placed on the workpiece placement portion 30 is described as a typical case. In FIG. 1, one previous workpiece W2 already subjected to inspection is placed on the workpiece placement table 78 located in the inspection portion 35.

As shown in FIG. 1, the first suction portion 61 of the suction unit 60 is positioned directly above the workpiece W1. In this state, the first suction portion 61 is descended toward the workpiece W1. The first suction portion 61 then adsorb the workpiece W1. After that, the first suction portion 61 and the workpiece W1 are ascended. Thus, the workpiece W1 held by the first suction portion 61 is transported by the first movement unit 41 toward the positioning mechanism 32.

Figure 5:
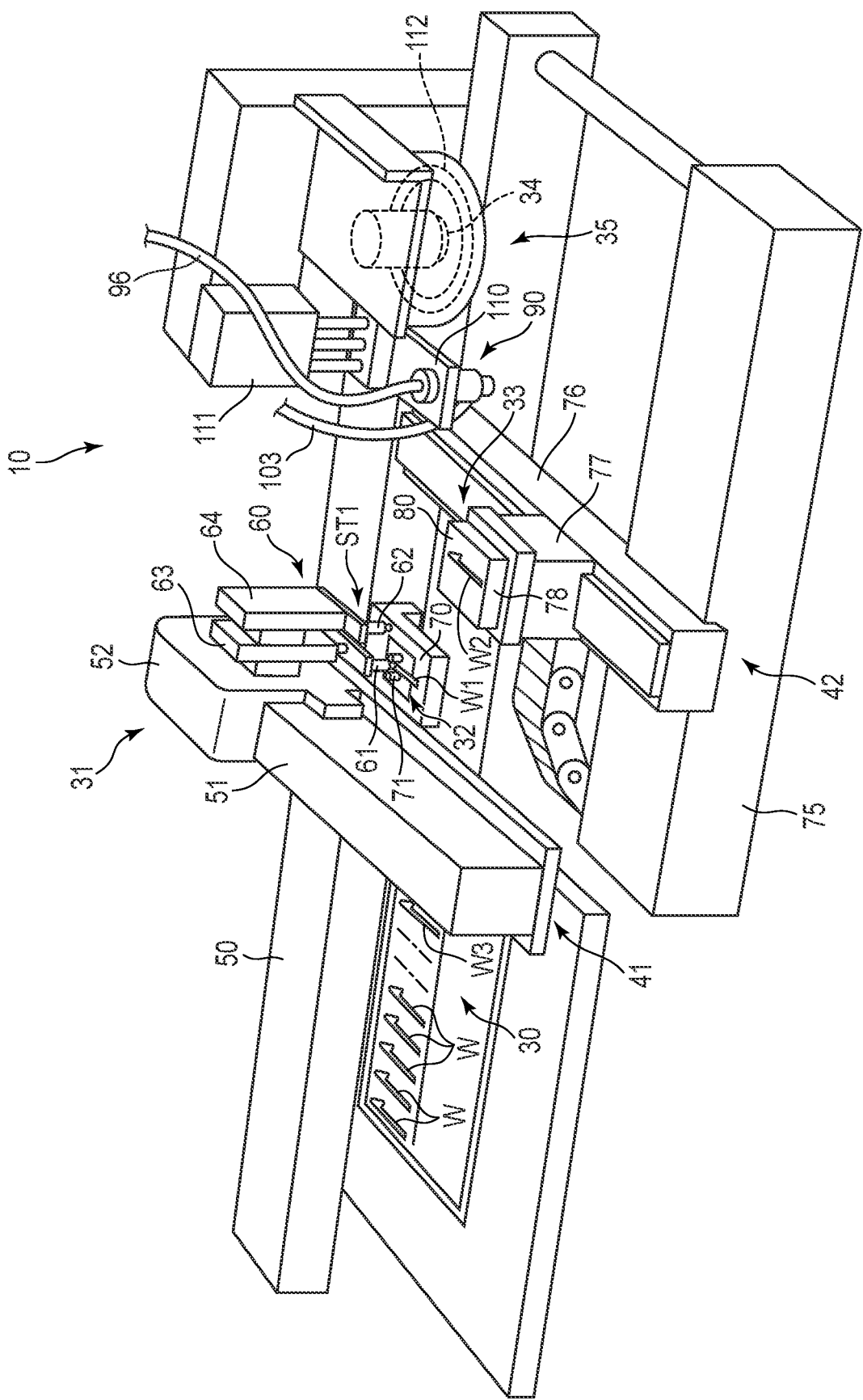
FIG. 5 is a perspective view illustrating a state in which the suction unit, workpieces and the like of the inspection device shown in FIG. 1 move to a second position.

FIG. 5 illustrates the situation where the suction unit 60, the workpieces and the like have been moved to the second position (positioning stage ST1). At the second position, the first suction portion 61 holding the workpiece W1 to be inspected is moved to above the positioning mechanism 32. The workpiece W1 is then positioned by the positioning member 71. At this time, the workpiece placement table 78 has been moved to near the positioning stage ST1. On the workpiece placement table 78, the one previous workpiece W2, for which the inspection has been completed, is placed.

Figure 6:
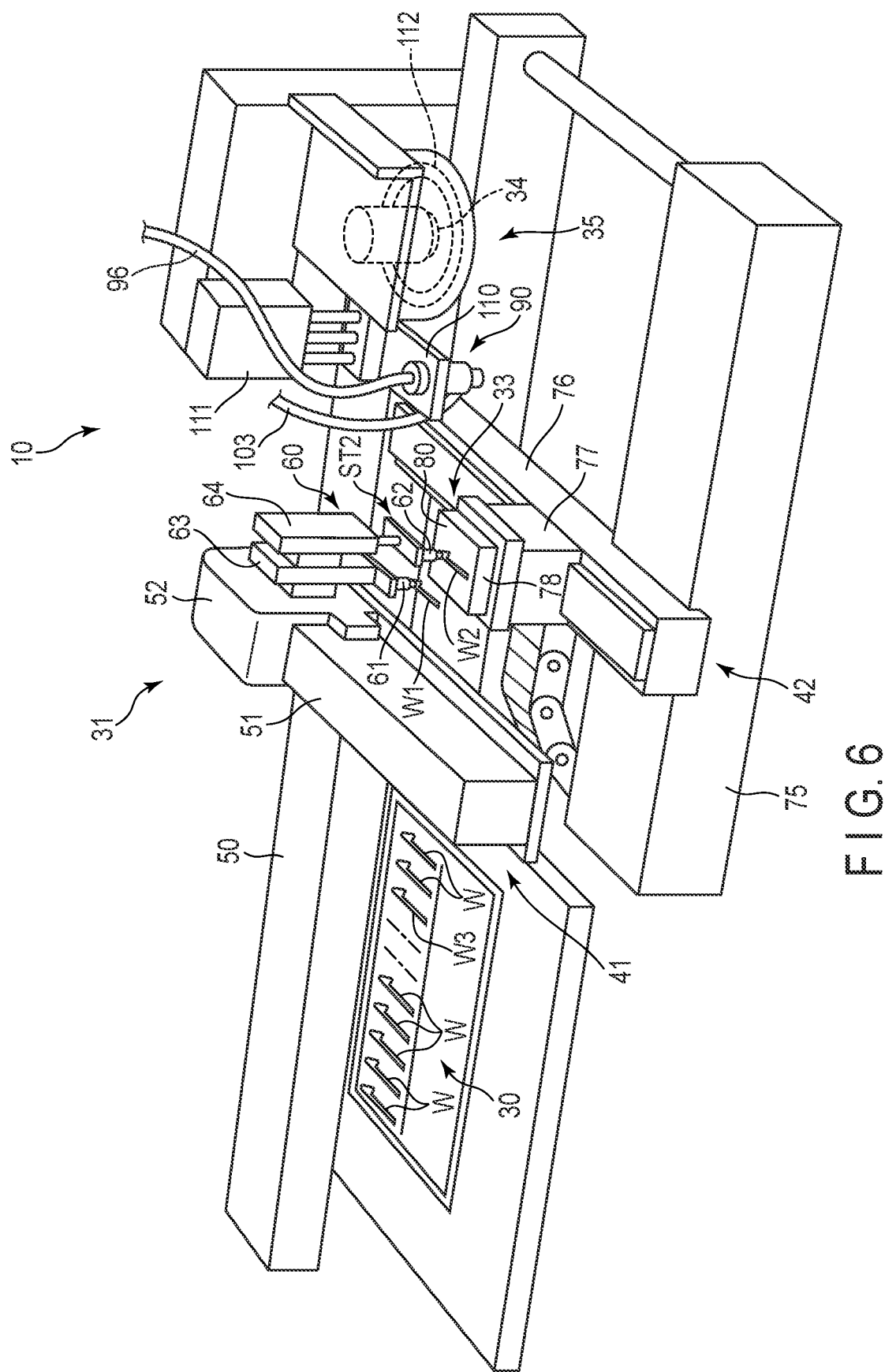
FIG. 6 is a perspective view of the inspection device, showing a state in which the suction unit, workpieces and the like move to a third position.

FIG. 6 illustrates the situation in which the suction unit 60, the workpiece placement table 78 and the like have been moved to the third position (transfer stage ST2). Here, the inspected workpiece W2 is on the workpiece placement table 78. As shown in FIG. 6, the second suction portion 62 is moved to directly above the inspected workpiece W2 and descended. The second suction portion 62 then adsorbs the inspected workpiece W2 and ascends. Thus, the inspected workpiece W2 is separated from the workpiece support surface 80.

Immediately thereafter, the workpiece W1 held by the first suction portion 61, which is to be subjected to inspection is moved to above the workpiece support surface 80 and descended. Then, when the negative pressure of the first suction portion 61 is shut off, the suction of the workpiece W1 by the first suction portion 61 is released. Thus, the workpiece W1 to be subjected to inspection is placed on the workpiece support surface 80.

Figure 7:
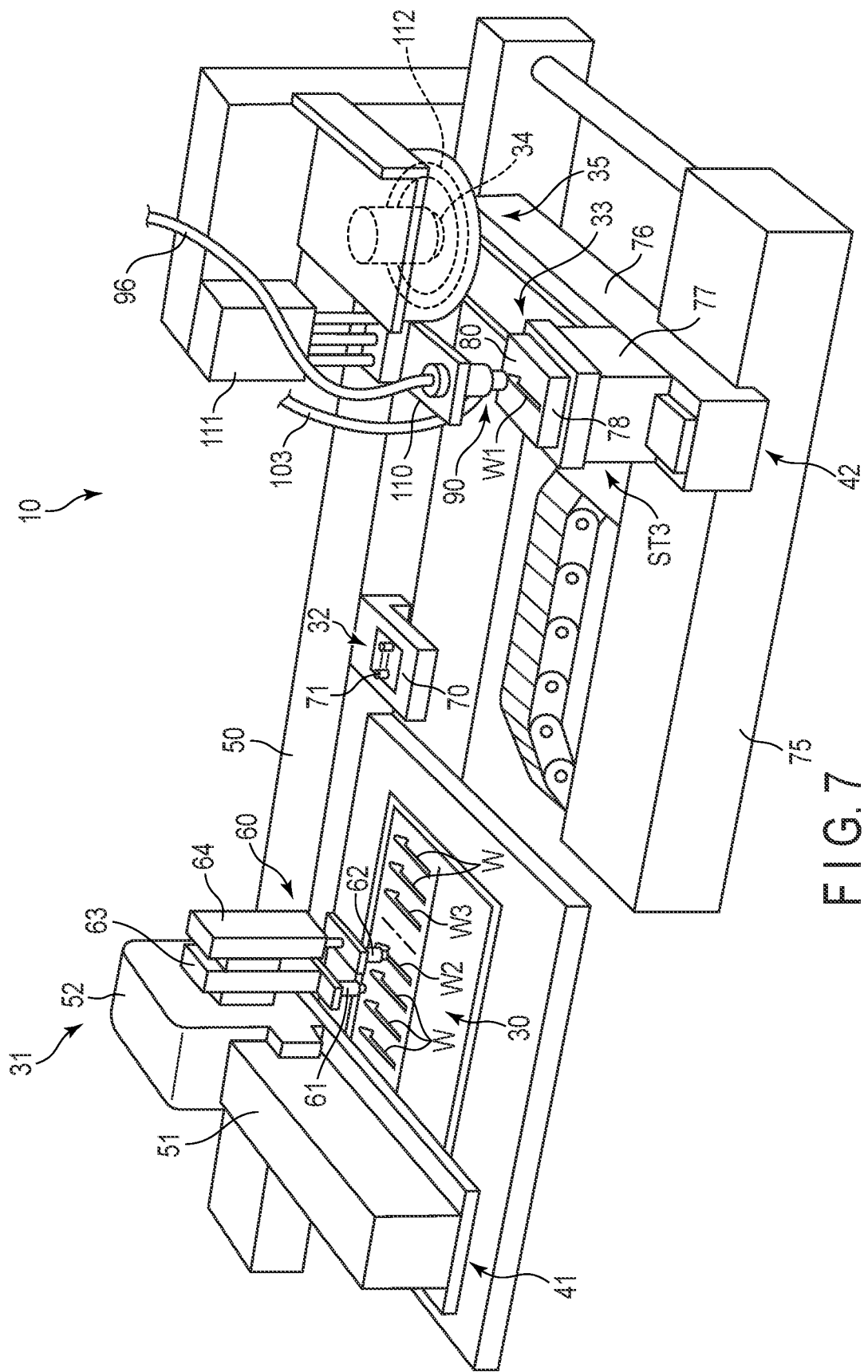
FIG. 7 is a perspective view of the inspection device, showing a state in which a second movement unit, workpieces and the like move to a fourth position.

FIG. 7 illustrates the situation where the second movement unit 42, the workpiece W1 and the like have moved to the fourth position (blowing stage ST3). Here, the workpiece W1 to be inspected is located below the blow suction unit 90. Onto this workpiece W1, ionized air is blown from the jet outlet 100 (shown in FIG. 4). At the same time as that of the air being blown, the second carriage 77 is moved in the Y-axis direction (the direction indicated by the arrow Y1 in FIG. 4) by the second movement unit 42. The ionized air is thus continuously blown in the length direction of the workpiece W1 from the first end portion E1 (near the base plate 20) to the second end portion E2 of the workpiece W1. The second movement unit 42 functions as a movement mechanism for moving the blow suction unit 90 relatively with respect to the length direction of the workpiece W.

As shown in FIG. 4, the ionized air is jetted toward the workpiece W1 from the jet outlet 100 of the inner cylinder 92. The jetted air blows on and reflects off the workpiece W1 and the workpiece support surface 80. The reflected air is suctioned into the suction chamber 102 from the suction inlet 101 at the lower end of the outer cylinder 91. Note here that the air that is blown on and reflected off the workpiece W1 and the workpiece support surface 80 may contain fine particles or the like. The air containing such particles can cause contamination of the clean room. The inspection device 10 is installed in a clean room. The blow suction unit 90 of this embodiment is suctions the air blown onto the workpiece W1 into the suction chamber 102 and discharges it through the filter 104 and the like. In this manner, it is possible to prevent the air containing particles from being released into the clean room.

The inspection device 10 of this embodiment blows ionized air onto the workpiece W1 to be inspected. Thus, static electricity that may be charged on the workpiece W1 can be removed. The workpiece W1 while the air is being blown thereonto is adsorbed onto the workpiece support surface 80 by the air suctioned therein through the suction holes 82. In this manner, a longitudinal part of the workpiece W1, which is thin and easily bendable, can be suppressed from being separated from the workpiece support surface 80 or warped. Thus, the workpiece W1 before inspection is securely adsorbed at a predetermined position on the workpiece support surface 80.

As shown in FIG. 7, the workpiece W1 to be inspected is moved to the blowing stage ST3. In contrast, the inspected workpiece W2 is transferred to the workpiece placement portion 30 while being held by the second suction portion 62. After that, the suction by the second suction portion 62 is released. Therefore, the inspected workpiece W2 is then set back to the predetermined position in the workpiece placement portion 30.

Figure 8:
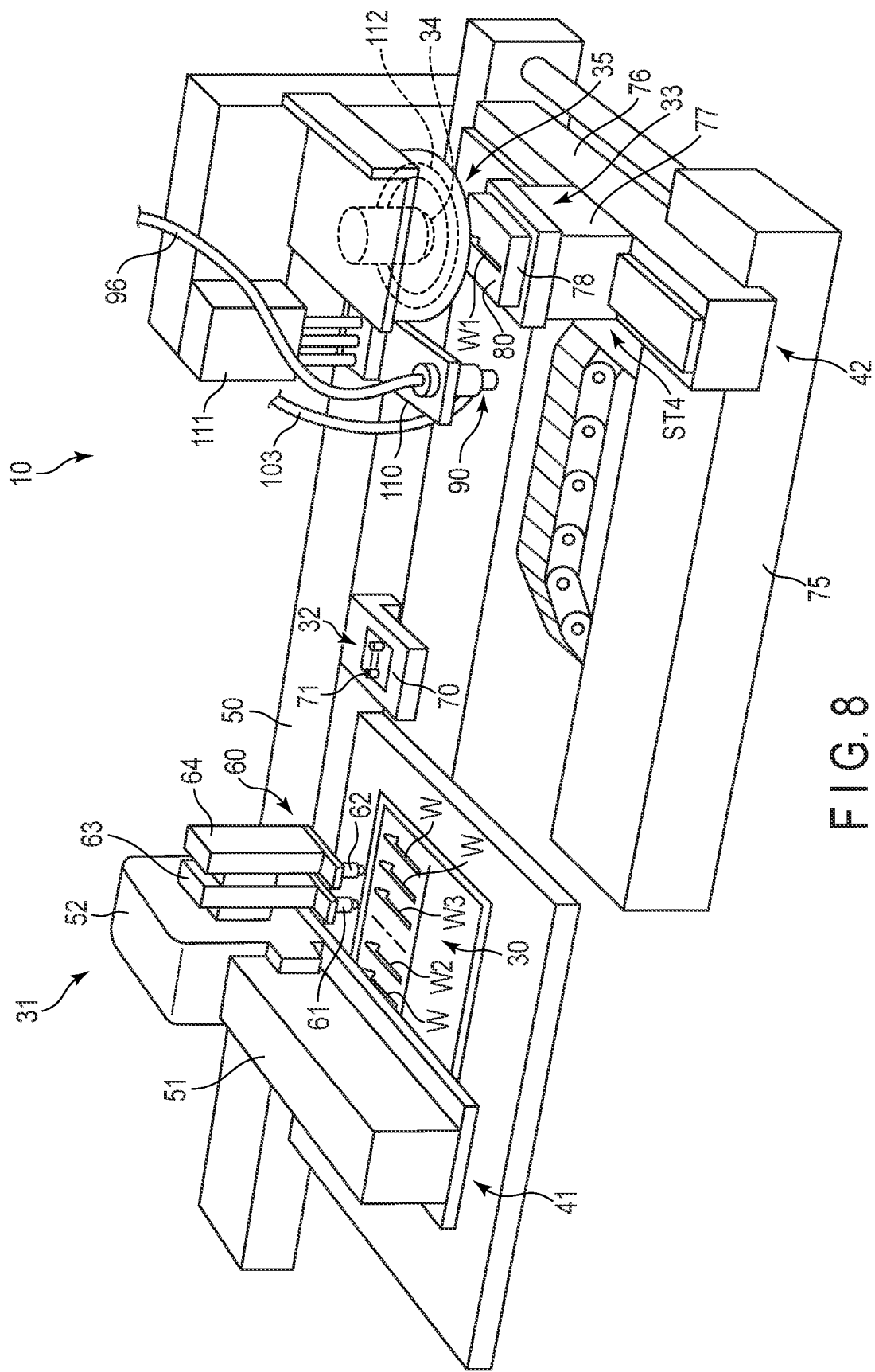
FIG. 8 is a perspective view of the inspection device, showing a state in which the second movement unit, workpieces and the like move to a fifth position.

FIG. 8 illustrates the situation where the second movement unit 42, the workpiece W1 and the like have been moved to the fifth position (inspection stage ST4). As shown in FIG. 8, the workpiece W1 placed on the workpiece support surface 80 is moved to below the camera 34. Then, the image of the workpiece W1 is shot by the camera 34. The shot image of the workpiece W1 is analyzed by the control portion 36 to judge whether the shape, etc., of the workpiece W is acceptable or inacceptable. The inspection results are stored in the memory of the control portion 36 and displayed as needed. Workpieces that are judged to be inacceptable as a result of the inspection are not used as products.

As shown in FIG. 8, the next workpiece W3 to be inspected is placed in the workpiece placement portion 30. When the workpiece W1 is being inspected in the inspection portion 35, the next workpiece W3 to be inspected is adsorbed by the first suction portion 61. The workpiece W3 adsorbed by the suction portion 61 is moved toward the positioning stage ST1 (FIG. 5). After the workpiece W3 is positioned in the positioning stage ST1, the workpiece W3 is moved toward the transfer stage ST2 (FIG. 6).

On the other hand, the workpiece W1 after the inspection, shown in FIG. 8 is moved toward the transfer stage ST2 (FIG. 6) while it is on the workpiece support surface 80. Then, the workpiece W1 is adsorbed by the second suction portion 62. After that, the workpiece W1 is sent by the first movement unit 41 to the workpiece placement portion 30 and set back to the predetermined position of the workpiece placement portion 30.

By repeating the processing steps described above, a plurality of workpieces W, W1, W3 placed on the workpiece placement portion 30 are transferred one after another to the inspection portion 35, and the workpiece W2 inspected in the inspection portion 35 is set back to the workpiece placement portion 30. In this way, the inspection of all workpieces placed in the workpiece placement portion 30 is completed.

In the inspection device 10 of this embodiment, the suction unit 60 includes a pair of suction portions (a first suction portion 61 and a second suction portion 62). The first suction portion 61 is used to move a workpiece to be subjected to inspection, from the workpiece placement portion 30 to the workpiece support surface 80. The second suction portion 62 is used to move the inspected workpiece from the workpiece support surface 80 back to the workpiece placement portion 30. That is, one suction unit 60 can hold the pre-inspection workpiece and the inspected workpiece simultaneously.

Thus, in the transfer stage ST2 shown in FIG. 6, the pre-inspection workpiece W1 and the inspected workpiece W2 can be placed at the same position on the workpiece support surface 80 in an interchanging manner. Note that the suction unit 60 may comprise only one suction portion. In that case, a first workpiece support surface for placing a pre-inspection workpiece thereon and a second workpiece support surface for placing an inspected workpiece are provided on one workpiece placement table 78. The workpiece placement table 78 is then moved by the second movement unit 42 according to the positions of the first workpiece support surface and the second workpiece support surface.

The inspection device 10 of this embodiment performs in the inspection portion 35, processes such as blowing air onto the workpiece, inspecting the workpiece with the camera 34 and the like. Further, the inspection device 10 moves the inspected workpiece back to the workpiece placement portion 30 and performs the process of adsorbing the next workpiece to be inspected onto the suction unit 60. According to the inspection device 10, these processes can be performed in parallel, and therefore a large number of workpieces can be inspected efficiently.

In this specification and the drawings, a plurality of reference symbols (W, W1, W2, W3) are used to indicate a plurality of workpieces for the sake of convenience of explanation. But this is only for convenience of explanation. For example, all of these workpieces may be the same, or the forms of these workpieces may differ from each other.

Needless to say, when implementing the present invention, the components of the workpiece holding device, for example, the workpiece placement table, the workpiece support surface, the suction unit, the movement unit, the blow suction unit and the like, can be changed in various ways. Further, the components of the inspection device, such as the workpiece placement portion, the inspection portion, the transport mechanism and the like, can be changed and implemented within a scope not to deviate from the essence of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A workpiece holding device, comprising:
   a workpiece placement table including a workpiece support surface on which a workpiece is placed;
   a suction hole formed in the workpiece support surface and opened at a position corresponding to the workpiece placed on the workpiece support surface;
   a negative pressure generating source connected to the suction hole and suctioning air through the suction hole;
   a blow suction unit including a jet outlet which jets a gas from above the workpiece toward the workpiece placed on the workpiece support surface and including a suction inlet which suctions the gas blown on and reflected off the workpiece; and
   a movement mechanism which moves the workpiece placed on the workpiece support surface and the blow suction unit relative to a length direction of the workpiece.

2. The workpiece holding device of claim 1, further comprising:
   an ionizer which ionizes the gas supplied to the jet outlet.

3. The workpiece holding device of claim 1, further comprising:
   a positioning pin on the workpiece support surface, which is inserted to a hole of the workpiece.

4. The workpiece holding device of claim 3, wherein the movement mechanism is a movement unit for moving the blow suction unit relative from a first end portion of the workpiece towards a second end portion.

5. The workpiece holding device of claim 4, wherein the positioning pin is located near the first end portion.

6. The workpiece holding device of claim 1, comprising: a plurality of suction holes each identical to the suction hole, formed to be spaced apart along the length direction of the workpiece.

7. The workpiece holding device of claim 3, wherein
the workpiece is a disk drive suspension, and
the positioning pin is inserted to a hole of a boss portion formed in a base plate of the disk drive suspension.

8. An inspection device comprising:
the workpiece holding device of claim 1;
a workpiece placement portion on which a plurality of the workpieces are placed;
an inspection portion provided at a location different from that of the workpiece placement portion, which inspects the workpieces; and
a transport mechanism which moves the workpieces placed in the workpiece placement portion, which are to be subjected to inspection, toward the inspection portion and moves the workpiece inspected in the inspection portion to the workpiece placement portion, wherein
the transport mechanism includes a suction unit which adsorbs workpieces placed on the workpiece placement portion, which are to be subjected to the inspection, releases adsorption of the workpieces to be subjected to the inspection when the workpieces are positioned on the workpiece support surface, absorbs the inspected workpiece placed on the workpiece support surface and releases the adsorption of the inspected workpiece when the inspected workpiece is positioned above the workpiece placement portion.

9. The inspection device of claim 8, wherein
the suction unit includes:
a first suction portion that adsorbs the workpieces placed on the workpiece placement portion, which are to be subjected to inspection, and holds the workpieces to be subjected to inspection until the workpieces are moved from the workpiece placement portion to above the workpiece support surface; and
a second suction portion that adsorbs the inspected workpiece placed on the workpiece support surface and holds the inspected workpiece until the inspected workpiece is moved from the workpiece support surface to above the workpiece placement portion.

\* \* \* \* \*